United States Patent [19]
DuLac et al.

[11] Patent Number: 5,327,926
[45] Date of Patent: Jul. 12, 1994

[54] FLOW REGULATOR

[75] Inventors: Joseph A. DuLac, Grosse Pointe; Timothy E. Wheeler, Mt. Clemens, both of Mich.

[73] Assignee: John A. Blatt, Grosse Pointe Farms, Mich.

[21] Appl. No.: 997,677

[22] Filed: Dec. 28, 1992

[51] Int. Cl.⁵ ............................................. G05D 16/10
[52] U.S. Cl. .................................. 137/116.3; 137/492.5
[58] Field of Search ............... 137/116.5, 116.3, 489.5, 137/492.5

[56] References Cited

U.S. PATENT DOCUMENTS

| | | | |
|---|---|---|---|
| 2,518,852 | 8/1950 | Annin | 137/116.5 |
| 2,706,995 | 4/1955 | May | 137/116.5 |
| 2,731,975 | 1/1956 | Boals | 137/116.5 |
| 2,985,490 | 5/1961 | Gates | 137/116.5 X |
| 3,022,118 | 2/1962 | Dobrikin | 137/116.5 X |
| 3,455,323 | 7/1969 | Haupt | 137/116.5 |
| 3,457,837 | 7/1969 | Powell | 137/116.5 X |
| 3,904,175 | 9/1975 | Deschenes | 137/116.5 X |
| 4,055,198 | 10/1977 | Iannelli | 137/116.5 |
| 4,370,997 | 2/1983 | Braithwaite | 137/116.3 |
| 4,452,267 | 6/1984 | Ott et al. | 137/116.5 |
| 4,612,950 | 9/1986 | Schmid-Welti | 137/116.5 |

*Primary Examiner*—Stephen M. Hepperle
*Attorney, Agent, or Firm*—Basile and Hanlon

[57] ABSTRACT

Pressure flow regulator for use in pneumatic pressure control devices for maintaining a constant predetermined output pressure from a given constant or variable input pressure. The regulator includes a main housing, an inlet port, an outlet port, an air adjustment regulator and an insert assembly forming air passages when installed in the main housing. The insert is formed such that when inserted in a bore machined into a blank, the insert and the bore mate to form chambers and passages needed for pressure regulation of the pneumatic medium, in this case air.

7 Claims, 3 Drawing Sheets

1

FLOW REGULATOR

FIELD OF THE INVENTION

The present invention generally relates to pneumatic system devices and, more specifically, concerns pneumatic pressure control devices for maintaining a constant predetermined output pressure from a given constant or variable input pressure.

BACKGROUND OF THE INVENTION

Pneumatic pressure controls are widely known and practiced in many forms in pneumatically powered and controlled systems. These systems usually require a constant predetermined pressure of a pneumatic medium, typically air, from a constant or varying input pressure source. Generally, a pneumatic pressure control device is composed of an inlet port, an outlet port, a valve control for communicating the inlet port with the outlet port when in a first position and providing an air tight seal between the inlet port and the outlet port when in a second position, and a regulator for controlling communication of the inlet port to the outlet port. In operation, when the outlet pressure drops below the predetermined pressure set in the regulator, the piston is engaged and the inlet port is connected to the outlet port until the outlet pressure reaches the predetermined pressure. Once the predetermined pressure is reached, the piston opens the seal between the outlet and inlet ports.

In manufacturing the air pressure control device, typically, a blank is cast and machined to form chambers and passages through which the pneumatic medium flows. Plugs, pistons and other parts needed to control flow and pressure are then formed and installed in the device. Machining the chambers and passages requires considerable cost and, consequently, if reduced without affecting quality, could reduce the cost of manufacturing the pneumatic pressure control device.

The present invention provides an insert that is formed such that when inserted in a bore machined into a blank, the insert and the bore mate to form the chambers and passages needed for pressure regulation. Preforming the insert to be subsequently mated with the bore reduces the amount of machining needed for the pressure control device, reduces the amount of assembly of the individual parts of the device, and thus reduces the cost of manufacturing the device.

SUMMARY OF THE INVENTION

The present invention of a pneumatic pressure regulator provides for a constant predetermined output pressure of a pneumatic medium from a constant or varying input pressure. The main structure of the regulator is a first housing including a first cylindrical bore of longitudinally varying radii, an inlet port and an outlet port. A second housing for installation in the first bore is complementary in shape to an inner surface of the first bore and includes O-ring seals for a fluid tight seal between the first and the second housings. The second housing also includes a second cylindrical bore sharing a common axis with the first cylindrical bore.

A first piston is located within the second bore and includes first and second members threadably received on each other. The second member includes a seal complementary in shape to a corresponding ridge located on the second housing for sealing contact therebetween. The first and second members are assembled with the second housing interposed between the first and second members of the first piston allowing limited longitudinal movement of the first piston relative to the second housing within the second bore. O-rings are provided for an air tight seal between the first and second members, between the first piston and the second housing, and between the first housing and the first piston.

The second housing further includes a first passage communicating the inlet port with the second bore and a second passage communicating said outlet port with the second bore. The first piston further includes a seal sealingly received on the second bore for communicating the first passage with the second passage when the first piston is engaged as a result of the outlet pressure being less than a predetermined pressure set in the regulator. The first piston is engaged for purposes of communicating the inlet port with the outlet port by use of a second piston complementary in shape with the first bore, received in the first bore by air tight rubber O-rings and juxtaposed with the first member of the first piston. A first housing cap for covering the first end of the first bore where the second piston is located has rubber seals to seal the first cap and the first housing. Consequently, an air tight chamber is formed between the second piston and the first housing cap. A regulator valve for adjusting the outlet air pressure connects the second passage with the chamber.

In operation, when the outlet pressure drops below a predetermined pressure set by the regulator, the regulator communicates the second passage with the chamber. The surface area of the second piston is considerably greater than the surface area of the first piston and thus allows the pressure in the chamber to depress the piston and overcome the counteracting force of the inlet pressure on the first piston. Thus, the inlet port is connected to the outlet port through the first and second passage communicated by the first piston. When the outlet pressure reaches the predetermined pressure set by the regulator, the regulator disconnects the chamber with the second passage, releases the pressure from the chamber thus disengaging the first piston and second piston and sealing the first passage from the second passage.

The present invention also provides for a safety mechanism that releases increased back pressure that could possibly enter the outlet port. A circular ridge forming a seat is located on the first member for flush contact of the second piston on the seal. The second piston includes a rubber seat providing an air tight seal between the first piston and the second piston. A third passage connects a vent port through the first member and the second member and is separated from the second passage by the seat sealingly coupled to the air tight seal located on the second piston. If a back pressure is experienced at the outlet port, the first piston is closed to prevent communication between the inlet port and the outlet port and becomes separated from the second piston thereby releasing the seat from the seal located on the second piston. The outlet port is then connected to the vent port releasing the excess pressure. When the outlet pressure resumes the predetermined pressure of the regulator, the first piston and the second piston are sealingly forced back together by a spring bias and a combination of the resistive force of the inlet pressure forcing the first piston toward the second piston and the pressure provided by the regulator in the chamber pressing the second piston on to the first piston.

A second housing cap covering the second end of the first bore is sealingly received on the first housing and includes the vent port connecting the third passage to the sealing means as aforementioned.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 1:
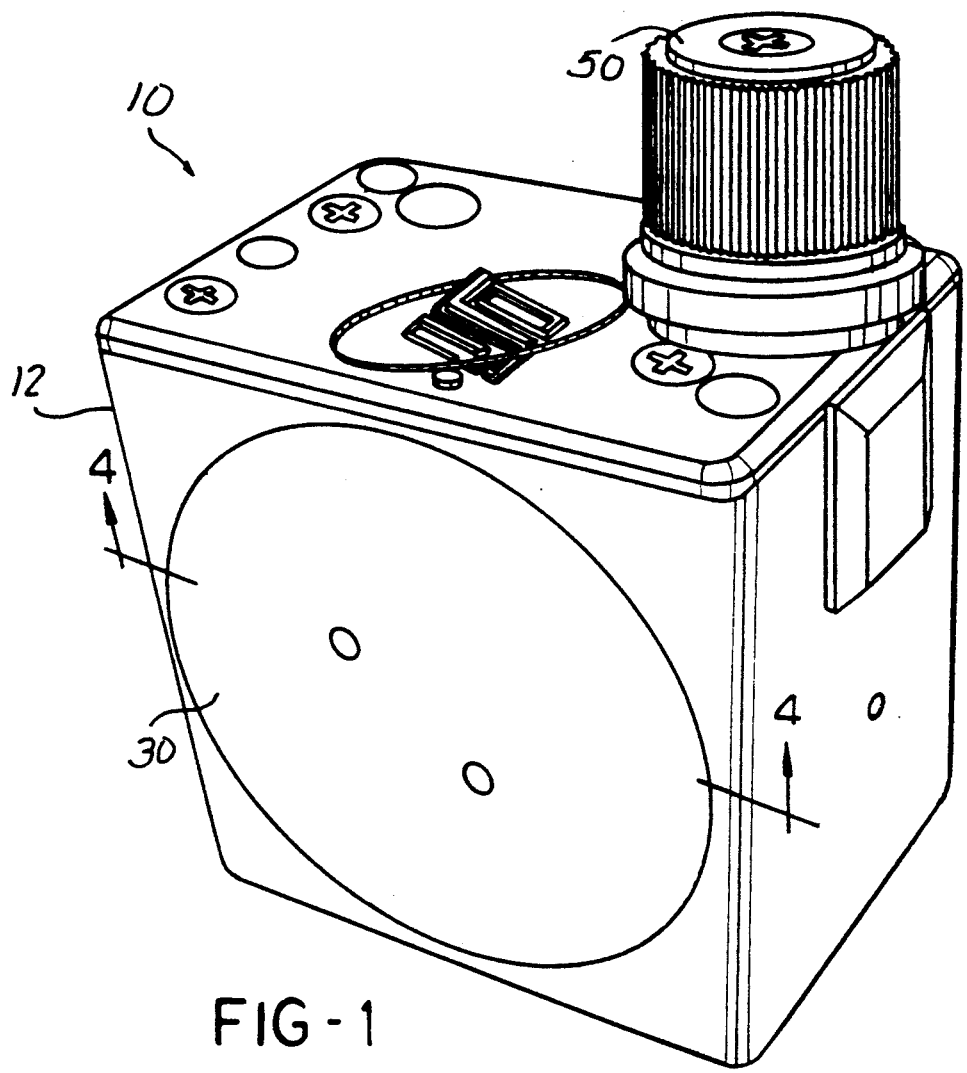
FIG. 1 is a perspective view of a valve constructed in accordance with the principles of the present invention and shown fully assembled.
Figure 2:
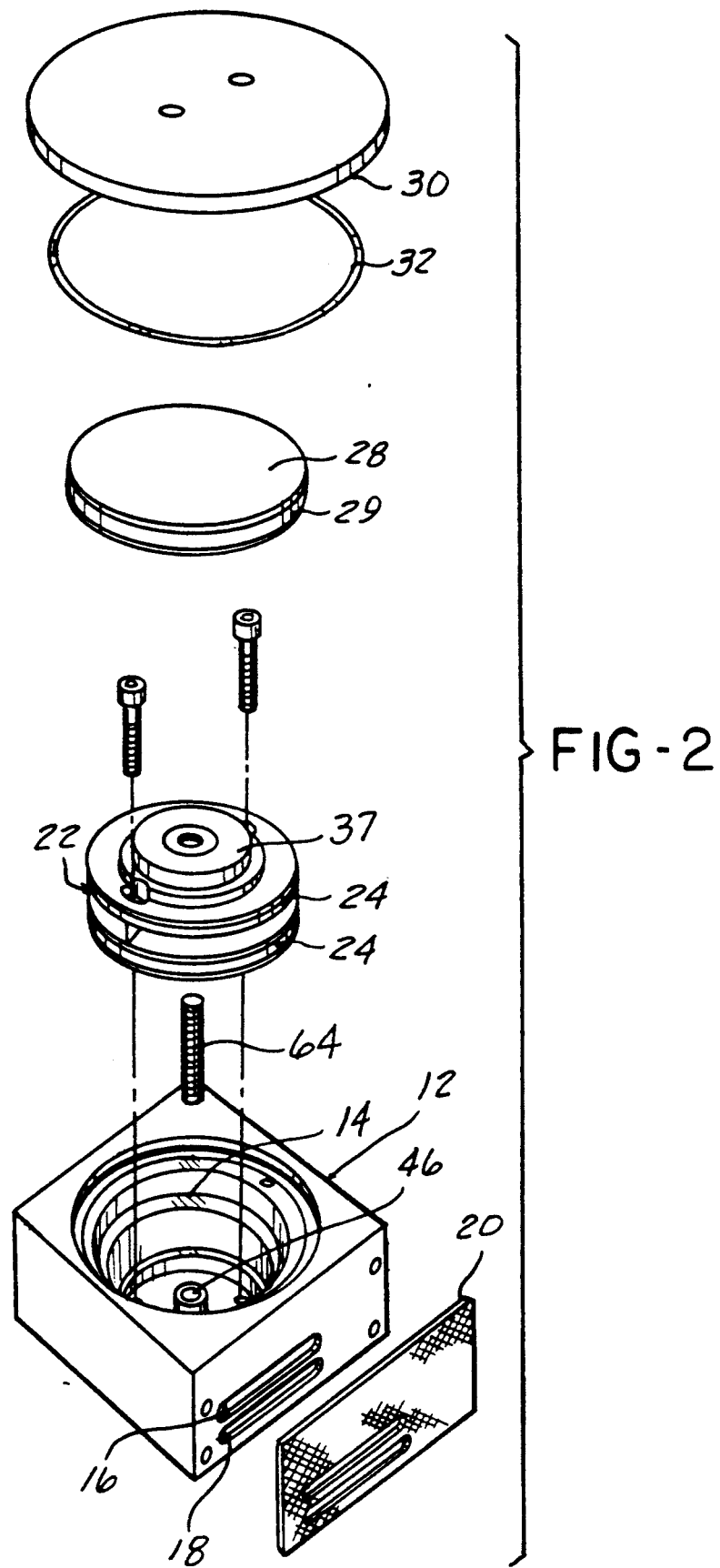
FIG. 2 is an exploded perspective view of the valve illustrated in FIG. 1.
Figure 4:
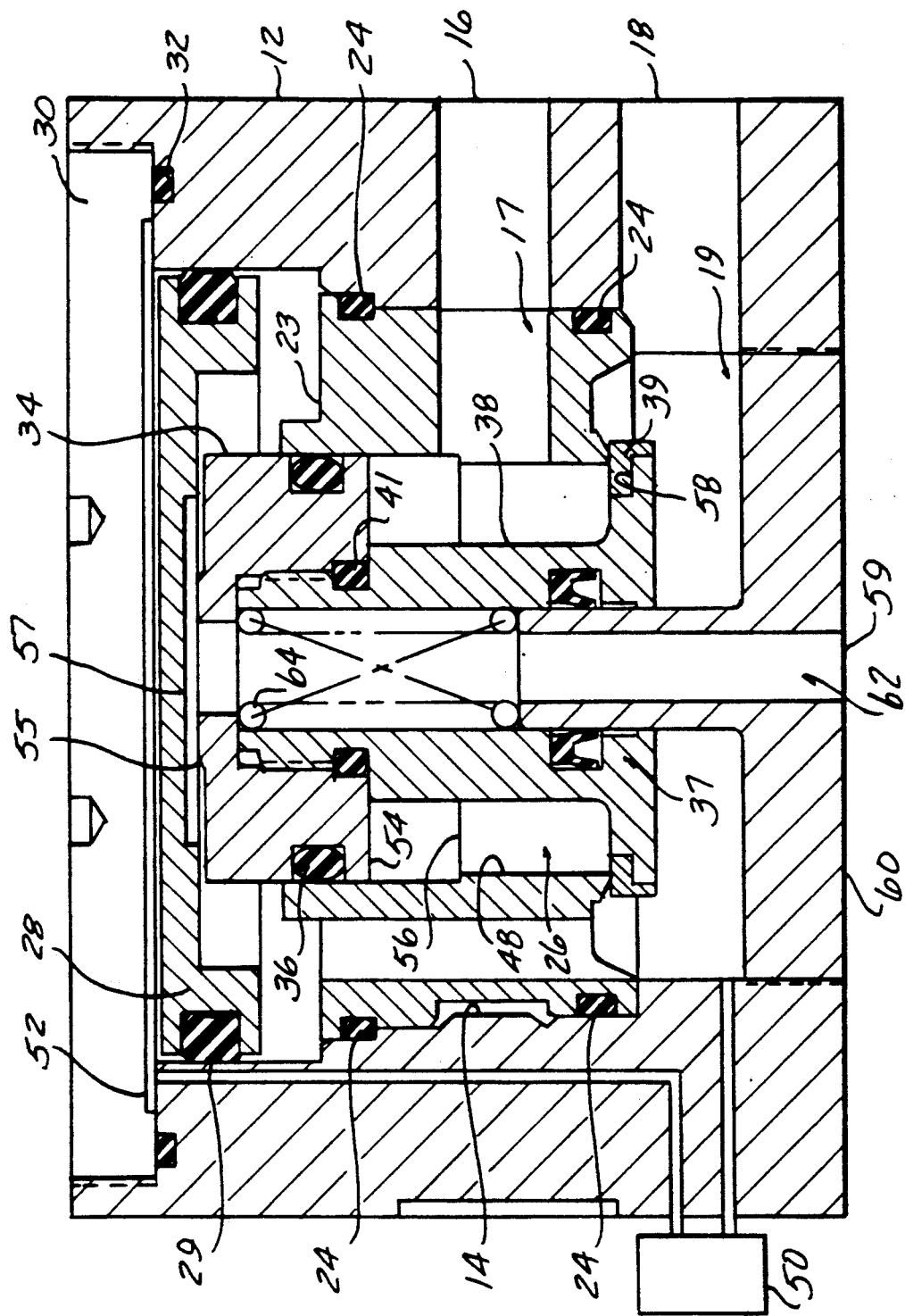
FIG. 4 is a cross-sectional view of the valve taken on line 4—4 of FIG. 2.

Referring now to FIGS. 1, 2 and 4, the flow regulator 10 is shown as comprising a main housing 12 having a first bore 14 of varying radii and inlet port 16 communicating with the first bore 14 via a first passage 17 and an outlet port 18 communicating with the first bore via a second passage 19. A mounting seal 20 is included in the preferred embodiment to provide an air tight seal between the inlet port and the outlet port when connected to the air system to be regulated.

Figure 3:
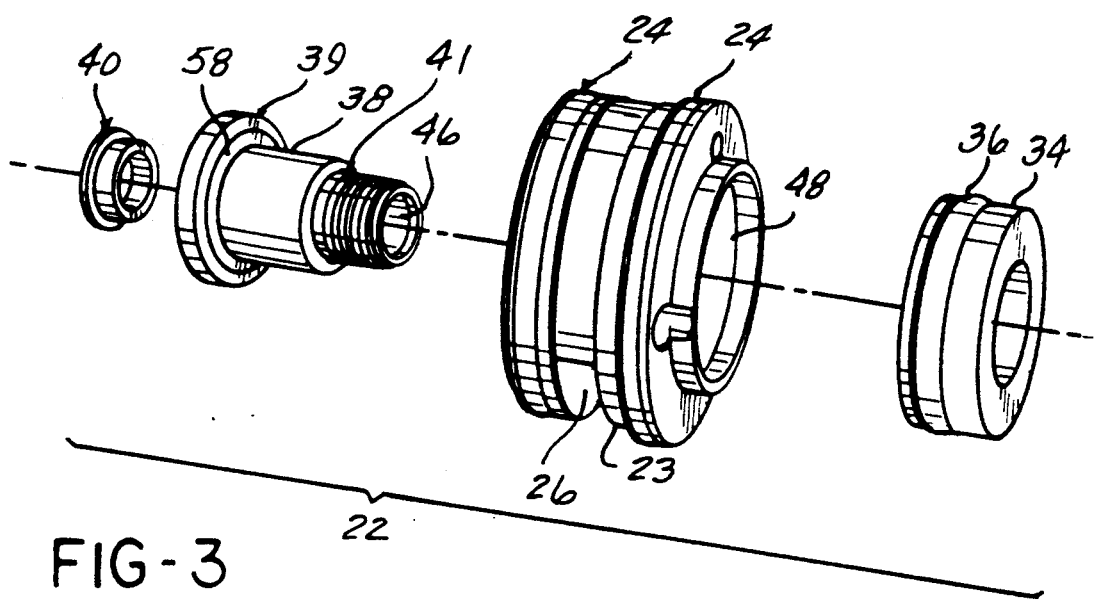
FIG. 3 is an exploded perspective view of an insert assembly of the valve shown in FIG. 2.

An insert assembly 22 is sealingly received in the first bore with O-rings 24. The insert assembly 22, as shown in FIG. 3, includes a second housing 23 with the O-rings 24 mounted thereon, a second bore 48 sharing a common axis with the first cylindrical bore 14. The assembly 22 also includes a first piston 37 made up of first member 34 with O-ring 36 sealingly received in the second bore 48 and second member 38 sealingly received in second bore 48 with O-rings 39, 41 and threadably received on the first member 34. The first member 45 includes a ridge 54 complementary in shape to a ridge 56 located on the second housing 23 for assembling the second housing 23 interposed between the first and second members of the first piston 37 while allowing limited longitudinal movement of the first piston 37 relative to the second housing 23 within the second bore 48.

The second housing further includes chamber 26 for providing air passages for the flow regulator 10 when the insert assembly 22 is installed in the first bore 14. O-ring 41 provides for an air tight seal between the first member 34 and second member 38. O-rings 36 and 39 provide for an air-tight seal between the first piston 37 and the second housing 23. O-ring 24 provides for an air-tight seal between the first housing 12 and the second housing 23.

The first piston 37 further includes a ledge 58 sealingly received on the second bore by O-ring 39 for communicating the first passage 17 with the second passage 19 when the first piston 37 is engaged as a result of the outlet pressure being less than a predetermined pressure set in the regulator. A second piston 28 with O-ring 29 mounted thereon is sealingly received in the first bore 14 and is juxtaposed with the second member 34 of the insert assembly 22. A first housing cap 30 is included for covering the first end of the first bore 14 where the second piston 28 is located and includes a rubber O-ring 32 for providing an air tight seal between the first cap 30 and the first housing 12. A regulator valve 50 is provided for adjusting the outlet air pressure and connects with a chamber space 52 formed between the first housing cap 30 and the second piston 28.

The present invention is designed to provide a second safety mechanism that releases increased back pressure that could possibly enter the outlet port thus damaging the regulator. The mechanism includes a circular ridge 55 formed on the second member 38 for flush contact of the second piston 28 on a rubber seal 57 that provides an air tight seal between the first piston 37 and the second piston 28. A third passage 62 connects a vent port 59 through the first member 34 and the second member 38 and is separated from the second passage 19 by the ridge 55 coupled to the air tight seal 57 located on the second piston 28. If back pressure is experienced at the outlet port 18, the second piston 28 is raised and separated from the first piston 37 releasing the ridge 55 from the seal 57 located on the second piston 28. The outlet port 18 is then connected to the vent port 59 releasing the excess pressure. When the outlet pressure resumes the predetermined pressure of the regulator 50, the first piston 37 and the second piston 28 are sealingly forced back together by a spring 64 and a combination of the resistive force of the inlet pressure forcing the first piston 37 toward the second piston 28 and the pressure provided by the regulator 50 in the chamber 52 pressing the second piston 28 onto the first piston 37.

A second housing cap 60 covering a second end of the first bore 14 includes the vent port 59 connecting the third passage 62 to the sealing means 57 as aforementioned.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A pneumatic pressure regulator for providing a constant predetermined pressure of a pneumatic medium from a constant or varying input pressure comprising:

a first housing including a first cylindrical bore of longitudinal varying radii, an inlet port and an outlet port;

a second housing complementary in shape to an inner surface of said first bore including sealing means for an airtight seal between said first and second housings and a second cylindrical bore sharing a common axis with said first cylindrical bore;

first piston means located within said second bore including a first member and a second member threadably received on said first member, each said member including ridges complementary in shape to ridges located on said second housing for providing limited captive reciprocal movement of said first piston means with respect to said second housing and sealing means for an airtight seal between said first and second members and between said first piston means and said second housing;

a first passage communicating said inlet port with said second bore;

a second passage communicating said outlet port with said second bore;

said first piston means further including a ledge sealingly received on said second bore for communicating said first passage with said second passage when said first piston is engaged as a result said outlet pressure being less than said predetermined pressure;

second piston means complementary in shape with said first bore including sealing means for an airtight seal between said second piston means and a surface of said first bore;

circular ridge means forming a seat located on said first member for flush contact of said second piston means on said seat, said second piston means including seat sealing means for an airtight seal between said first piston means and said second piston means;

a third passage connecting a vent port through said first member and said second member with said seat sealing means, said third passage sealed off from said second passage when said seat is in contact with said seat seal;

a first housing cap for covering said first end of said first bore where said second piston means is located, said first cap including sealing means for providing in airtight seal between said first cap and said first housing;

chamber means formed by excess space between said first housing cap and said second piston means;

a second housing cap covering a second end of said first bore, said second cap including sealing means for providing an airtight seal between said second cap and said first housing, and mating means defining said vent port and said third passage, for mating fit with a portion of said second member; and regulator means for communicating said second passage with said chamber means when said outlet pressure is less than said predetermined pressure, said regulator means releasing pressure from said first passage into said chamber means to longitudinally move said second piston means, thereby separating said ledge of said first piston means from said second housing, releasing pressure from said inlet port and thus raising said outlet pressure up to said predetermined pressure;

when said outlet pressure exceeds said predetermined pressure, said second passage communicates with said third passage by separating said seat of said first piston means from said seat seal of said second piston means as a result of increased pressure and thus releasing excess outlet pressure above said predetermined pressure through said vent port.

2. The pneumatic pressure regulator for providing a constant predetermined pressure of a pneumatic medium from a constant or varying input pressure comprising:

first housing means having a first aperture extending along a longitudinal axis between first and second ends, an inlet port and an outlet port in communication with said first aperture;

second housing means insertable within said first aperture for sealing engagement therewith, said second housing defining a second aperture extending coaxially along said longitudinal axis;

first piston means disposed within said second aperture for limited captive reciprocal movement toward said first and second ends, wherein movement toward said first end prevent fluid communication between said inlet port and said outlet port, and movement toward said second end allows fluid communication between said inlet port and said outlet port;

second piston means engageable within said first aperture for movement toward said first and second ends, wherein movement toward said first end allows said first piston means toward said first end and movement toward said second end urges said first piston means toward said second end;

said second piston means defining a chamber in cooperation with said first housing means, said chamber selectively communicable with said outlet port; and control means for selectively communicating said chamber with said outlet port.

3. The pneumatic pressure regulator of claim 2 further comprising:

said first housing means including a vent port in communication with said first aperture; and said second piston means normally engaged with said first piston means to prevent communication between said vent port and said outlet port and moveable out of engagement with said first piston means to allow communication between said vent port and said outlet port.

4. The pneumatic pressure regulator of claim 2 further comprising:

biasing means for urging said first piston means toward said first end.

5. The pneumatic pressure regulator of claim 2 further comprising:

said first piston means having a first member and a second member separable from one another for assembly with said second housing means such that said second housingmeans is assembled between said first and second members prior to placement of said assembly of said first piston means and second housing means within said first aperture of said first housing means.

6. The pneumatic pressure regulator of claim 2, further comprising:

control means responsive to pressure in said outlet port for moving said first piston means toward said second end for maintaining a constant pressure in said outlet port.

7. The pneumatic pressure regulator of claim 4 further comprising:

said first housing means including first and second end caps adjacent said first and second ends respectively, said first end cap assembled with respect to said housing means for enclosing said first end of said first aperture, said second end cap having a vent port in communication with said first aperture, said second end cap slidably receiving said first piston means thereon and assembled with respect to said housing means for enclosing said second end of said first aperture.

* * * * *

UNITED STATES PATENT AND TRADEMARK OFFICE
CERTIFICATE OF CORRECTION

PATENT NO. : 5,327,926
DATED : July 12, 1994
INVENTOR(S) : Joseph A. DuLac and Timothy E. Wheeler It is certified that error appears in the above-indentified patent and that said Letters Patent is hereby corrected as shown below:

Column 2, line 12, after "on", please insert --an opposed edge of--.

Column 4, line 1, please delete "second" and insert --first--.

Column 6, line 8, please delete "prevent" and insert --prevents--.

Column 6, line 44, please delete "housingmeans" and insert --housing means--.

Signed and Sealed this

Twenty-seventh Day of September, 1994

BRUCE LEHMAN

Attest:

Attesting Officer         Commissioner of Patents and Trademarks